United States Patent
Zong et al.

(10) Patent No.: US 12,154,024 B2
(45) Date of Patent: Nov. 26, 2024

(54) LEARNING WORD REPRESENTATIONS VIA COMMONSENSE REASONING

(71) Applicant: NEC Laboratories America, Inc., Princeton, NJ (US)

(72) Inventors: Bo Zong, West Windsor, NJ (US); Haifeng Chen, West Windsor, NJ (US); Zhen Wang, Columbus, OH (US)

(73) Assignee: NEC Corporation, Tokyo (JP)

( * ) Notice: Subject to any disclaimer, the term of this patent is extended or adjusted under 35 U.S.C. 154(b) by 690 days.

(21) Appl. No.: 17/398,476

(22) Filed: Aug. 10, 2021

(65) Prior Publication Data

US 2022/0051083 A1 Feb. 17, 2022

Related U.S. Application Data

(60) Provisional application No. 63/115,868, filed on Nov. 19, 2020, provisional application No. 63/083,203, filed on Sep. 25, 2020, provisional application No. 63/063,985, filed on Aug. 11, 2020.

(51) Int. Cl.
| | |
|---|---|
| *G06F 40/30* | (2020.01) |
| *G06F 18/211* | (2023.01) |
| *G06F 18/213* | (2023.01) |
| *G06N 3/048* | (2023.01) |
| *G06N 5/02* | (2023.01) |
| *G06F 16/33* | (2019.01) |

(52) U.S. Cl.
CPC ............ *G06N 3/048* (2023.01); *G06F 18/211* (2023.01); *G06F 18/213* (2023.01); *G06N 5/02* (2013.01); *G06F 16/3344* (2019.01); *G06F 40/30* (2020.01)

(58) Field of Classification Search
CPC ............................ G06F 40/30; G06F 16/3344
See application file for complete search history.

(56) References Cited

U.S. PATENT DOCUMENTS

| | | | |
|---|---|---|---|
| 2016/0358094 A1* | 12/2016 | Fan | G06F 16/24578 |
| 2018/0268287 A1* | 9/2018 | Johansen | G06F 18/24133 |
| 2021/0109995 A1* | 4/2021 | Mihindukulasooriya | |
| | | | G06F 40/247 |

OTHER PUBLICATIONS

Mikolov, et al. "Efficient Estimation of Word Representations in Vector Space," arXiv:1301.3781 [cs.CL], Sep. 2013. (Year: 2013).*

(Continued)

*Primary Examiner* — Feng-Tzer Tzeng
(74) *Attorney, Agent, or Firm* — Joseph Kolodka

(57) ABSTRACT

A method trains a recursive reasoning unit (RRU). The method receives a graph for a set of words and a matrix for a different set of words. The graph maps each word in the set of words to a node with node label and indicates a relation between adjacent nodes by an edge with edge label. The matrix indicates word co-occurrence frequency of the different set of words. The method discovers, by the RRU, reasoning paths from the graph for word pairs by mapping word pairs from the set of words into a source word and a destination word and finding the reasoning paths therebetween. The method predicts word co-occurrence frequency using the reasoning paths. The method updates, responsive to the word co-occurrence frequency, model parameters of the RRU until a difference between a predicted and true word occurrence are less than a threshold amount to provide a trained RRU.

18 Claims, 7 Drawing Sheets

(56) References Cited

OTHER PUBLICATIONS

Xiong, et al., "DeepPath: A Reinforcement Learning Method for Knowledge Graph Reasoning," cs.CL Jul. 2018. (Year: 2018)—see previous Office action. (Year: 2018).*
Shao, et al. "A survey of research hotspots and frontier trends of recommendation systems from the perspective of knowledge graph," Elsevier, 2020. (Year: 2020)—see previous Office action. (Year: 2020).*
Xu, et al. "RC-NET: A General Framework for Incorporating Knowledge into Word Representation," CIKM'14, Nov. 2014. (Year: 2014)—see previous Office action. (Year: 2014).*
Liu, "Commonsense Knowledge Enhanced Embeddings for Solving Pronoun Disambiguation Problems in Winograd Schema Challenge," arXiv:1611.04146 [cs.Al], Dec. 2016. (Year: 2016)—see previous Office action. (Year: 2016).*
Belinkov, Yonatan, et al. "Interpretability and Analysis in Neural NPL", In Proceedings of the 58th Annual Meeting of the Association for Computational Linguistics: Tutorial Abstracts. Jul. 2020, pp. 1-5.
Bollegala, Danushka, et al. "Joint word representation learning using a corpus and a semantic lexicon", InProceedings of the AAAI Conference on Artificial Intelligence, vol. 30, No. 1. Mar. 5, 2016, pp. 2690-2696.
Bordes, Antoine, et al. "Translating Embeddings for Modeling Multirelational Data", In Advances in Neural Information Processing Systems. Dec. 5, 2013, pp. 1-9.
Bosselut, Antoine, et al. "Comet: Commonsense Transformers for Automatic Knowledge Graph Construction", arXiv preprint arXiv:1906.05317. Jun. 14, 2019, pp. 1-18.
Brown, Tom B., et al. "Language Models are Few-Shot Learners", arXiv preprint arXiv:2005.14165. Jul. 22, 2020, pp. 1-75.
Chen, Wenhu, et al. "Variational Knowledge Graph Reasoning", arXiv preprint arXiv:1803.06581. Oct. 23, 2018, pp. 1-10.
Conneau, Alexis, et al. "What You Can Cram into a Single Vector: Probing Sentence Embeddings for Linguistic Properties", arXiv preprint arXiv:1805.01070. Jul. 8, 2018, pp. 1-14.
Das, Rajarshi, et al. "Go For a Walk and Arrive at the Answer: Reasoning Over Paths in Knowledge Bases Using Reinforcement Learning", arXiv preprint arXiv:1711.05851. Dec. 30, 2018, pp. 1-18.
Devlin, Jacob, et al. "Bert: Pre-Training of Deep Bidirectional Transformers for Language Understanding", arXiv preprint arXiv:1810.04805. May 24, 2019, pp. 1-16.
Faruqui, Manaal, et al. "Retrofitting Word Vectors to Semantic Lexicons", arXiv preprint arXiv:1411.4166. Mar. 22, 2015, pp. 1-10.
Gilmer, Justin, et al. "Neural Message Passing for Quantum Chemistry", arXivpreprint arXiv:1704.01212. Jul. 17, 2017, pp. 1-10.
Guan, Jian, et al. "Story Ending Generation with Incremental Encoding and Commonsense Knowledge", In Proceedings of the AAAI Conference on Artificial Intelligence, vol. 33. Jul. 17, 2019, pp. 6473-6480.
Guidotti, Riccardo, et al. "Local Rule-Based Explanations of Black Box Decision Systems", arXiv preprint arXiv:1805.10820. May 28, 2018, pp. 1-10.
Guu, Kelvin, et al. "Traversing Knowledge Graphs in Vector Space", InProceedings of the 2015 Conference on Empirical Methods in Natural Language Processing. Aug. 19, 2015, pp. 1-10.
Hamilton, William L., et al. "Inductive Representation Learning on Large Graphs", In NIPS. Dec. 4, 2017, pp. 1-19.
Han, Xiaochuang, et al. "Explaining Black Box Predictions and Unveiling Data Artifacts through Influence Functions", arXiv preprint arXiv:2005.06676. May 14, 2020, pp. 1-11.
Koh, Pang Wei, et al. "Understanding Black-Box Predictions via Influence Functions", arXiv preprint arXiv:1703.04730. Jul. 17, 2017, pp. 1-10.
Lenat, Douglas B. "Cyc: A Large-Scale Investment in Knowledge Infrastructure", Communications of the ACM. Nov. 1995, pp. 32-38.

Lengerrich, Benjamin J., et al. "Retrofitting Distributional Embeddings to Knowledge Graphs with Functional Relations", arXiv preprint arXiv:1708.00112. Aug. 1, 2017, pp. 1-14.
Li, Jiwei, et al. "Understanding Neural Networks through Representation Erasure", arXiv preprint arXiv:1612.08220. Jan. 10, 2017, pp. 1-18.
Lin, Bill Yuchen, et al. "Kagnet: Knowledge-Aware Graph Networks for Commonsense Reasoning", arXiv preprint arXiv:1909.02151. Sep. 4, 2019, pp. 1-11.
Lin, Xi Victoria, et al. "Multi-Hop Knowledge Graph Reasoning with Reward Shaping", arXiv preprint arXiv:1808.10568. Sep. 11, 2018, pp. 1-12.
Liu, Quan, et al. "Commonsense Knowledge Enhanced Embeddings for Solving Pronoun Disambiguation Problems in Winograd Schema Challenge", arXiv preprint arXiv:1611.04146. Dec. 22, 2016, pp. 1-17.
Liu, Weijie, et al. "K-bert: Enabling Language Representation with Knowledge Graph", In AAAI. Apr. 3, 2020, pp. 2901-2908.
Lobue, Peter, et al. "Types of Common-Sense Knowledge Needed for Recognizing Textual Entailment", InProceedings of the 49th annual meeting of the association for computational linguistics: human language Technologies, Jun. 2011, pp. 329-334.
Logan IV, Robert L., et al. "Barack's Wife Hillary: Using Knowledge-Graphs for Fact-Aware Language Modeling", arXiv preprint arXiv:1906.07241. Jun. 20, 2019, pp. 1-10.
Mihaylow, Todor, et al. "Knowledgeable Reader: Enhancing Cloze-Style Reading Comprehension with External Commonsense Knowledge", arXiv preprint arXiv:1805.07858. May 21, 2018, pp. 1-19.
Mikolov, Tomas, et al. "Efficient Estimation of Word Representations in Vector Space", arXiv preprint arXiv:1301.3781. Sep. 7, 2013, pp. 1-12.
Mikolov, Tomas, et al. "Distributed Representations of Words and Phrases and Their Compositionality", In Advances in neural information processing Systems. Dec. 5, 2013, pp. 1-9.
Miller, George A. "Wordnet: A Lexical Database for English", Communications of the ACM. Nov. 1, 1995, pp: 39-41.
Murdoch, W. James, et al. "Definitions, Methods, and Applications in Interpretable Machine Learning", Proceedings of the National Academy of Sciences. Oct. 29, 2019, pp. 22071-22080.
Neelakantan, Arvind, et al. "Compositional Vector Space Models for Knowledge Base Completion", arXiv preprint arXiv:1504.06662. May 27, 2015, pp. 1-11.
Pennington, Jeffrey, et al. "Glove: Global Vectors for Word Representation", In Proceedings of the 2014 conference on empirical methods in natural language processing (EMNLP). Oct. 2014, pp. 1532-1543.
Peters, Matthew E., et al. "Deep Contextualized Word Representations", arXiv preprint arXiv:1802.05365. Mar. 22, 2018, pp. 1-15.
Peters, Matthew E., et al. "Knowledge Enhanced Contextual Word Representations", arXiv preprint arXiv:1909.04164. Oct. 31, 2019, pp. 1-14.
Radford, Alec, et al. "Improving Language Understanding by Generative Pre-Training". 2018, pp. 1-12.
Sap, Maarten, et al. "Atomic: An Atlas of Machine Commonsense for ifthen Reasoning", In Proceedings of the AAAI Conference on Artificial Intelligence, vol. 33. Jul. 17, 2019, pp. 3027-3035.
Shen, Yelong, et al. "M-walk: Learning to Walk Over Graphs Using Monte Carlo Tree Search", InAdvances in Neural Information Processing Systems. Dec. 18, 2018, pp. 1-17.
Speer, Robyn, et al. "Conceptnet 5.5: An Open Multilingual Graph of General Knowledge", AAAI'17, AAAI Press. Feb. 12, 2017, pp. 4444-4451.
Sun, Yu, et al. "Ernie: Enhanced Representation Through Knowledge Integration", arXiv preprint arXiv:1904.09223. Apr. 19, 2019, pp. 1-8.
Talmor, Alon, et al. "Commonsenseqa: A Question Answering Challenge Targeting Commonsense Knowledge", arXiv preprint arXiv:1811.00937. Mar. 15, 2019, pp. 1-10.
Tandon, Niket, et al. "Webchild 2.0: Fine-Grained Commonsense Knowledge Distillation", In Proceedings of ACL 2017, System Demonstrations. Aug. 2017, pp. 115-120.

(56) References Cited

OTHER PUBLICATIONS

Tenney, Ian, et al. "What Do You Learn From Context? Probing for Sentence Structure in Contextualized Word Representations", arXiv preprint arXiv:1905.06316. May 15, 2019, pp. 1-17.

Toutanova, Kristina, et al. "Compositional Learning of Embeddings for Relation Paths in Knowledge Base and Text", In Proceedings of the 54th Annual Meeting of the Association for Computational Linguistics, vol. 1: Long Papers. Aug. 2016, pp. 1434-1444.

Wang, Yanjie, et al. "On Multi-Relational Link Prediction with Bilinear Models", In Thirty-Second AAAI Conference on Artificial Intelligence. Apr. 29, 2018, pp. 4227-4234.

Xiong, Wenhan, et al. "Deeppath: A Reinforcement Learning Method for Knowledge Graph Reasoning", arXiv preprint arXiv:1707.06690. Jul. 7, 2018, pp. 1-10.

Yang, Bishan, et al. "Embedding Entities and Relations for Learning and Inference in Knowledge Bases", In Proceedings of the International Conference on Learning Representations (ICLR) 2015. Aug. 29, 2015, pp. 1-12.

Yu, Donghan, et al. "Jaket: Joint pre-training of knowledge graph and language understanding", arXiv preprint arXiv:2010.00796. Oct. 2, 2020, pp. 1-11.

Zellers, Rowan, et al. "From recognition to cognition: Visual Commonsense Reasoning", In Proceedings of the IEEE Conference on Computer Vision and Pattern Recognition. Jun. 15, 2019, pp. 6720-6731.

Zhang, Sheng, et al. "Record: Bridging the gap between human and machine Commonsense reading comprehension", arXiv preprint arXiv:1810.12885. Oct. 30, 2018, pp. 1-14.

\* cited by examiner

LEARNING WORD REPRESENTATIONS VIA COMMONSENSE REASONING

RELATED APPLICATION INFORMATION

This application claims priority to U.S. Provisional Patent Application No. 63/115,868, filed on Nov. 19, 2020, U.S. Provisional Patent Application No. 63/083,203, filed on Sep. 25, 2020, and U.S. Provisional Patent Application No. 63/063,985, filed on Aug. 11, 2020, incorporated herein by reference in their respective entireties.

BACKGROUND

Technical Field

The present invention relates to language processing and more particularly to learning word representations via commonsense reasoning.

Description of the Related Art

The problem of word representation learning involves, given a set of words of interest, learning vector representations for individual words so that words of more similar semantics are closer in the learned vector space. Word representation learning is a fundamental step for many downstream natural language understanding tasks, such as recommendation, document classification, sentiment analysis, question answering, and so on.

Existing word representation systems, such as word2vec and BERT, suffer the following two issues.

Domain adaptation is label-demanding. Given a pre-trained word representation system, in order to achieve good performance in downstream tasks, it is necessary to use labels from downstream tasks to fine tune word representations. To achieve such domain adaptation using existing systems, one usually needs to prepare a large number of labels, which puts a barrier to widely apply such automation in tasks where it is expensive or impractical to collect a large quantity of labels.

It is hard to justify the learned vector space. Given a pair of words, existing word representation systems can tell how close they are, but they are unable to justify why they are close. Without human-understandable justification, it is hard for human experts or end customers to trust the recommendation or decision from downstream machine learning models, especially in high-stake domains of medical healthcare, financial, complex system management, and so on.

SUMMARY

According to aspects of the present invention, a computer-implemented method is provided for training a recursive reasoning unit (RRU) to learn word representations. The method includes receiving a knowledge graph for a set of words and a co-occurrence matrix for a different set of words in a training phase. The knowledge graph (i) maps each of the words in the set of words to a node having a node label and (ii) indicates a relation between adjacent nodes by an edge having an edge label. The co-occurrence matrix indicates word co-occurrence frequency of the different set of words. The method further includes discovering, by the RRU, reasoning paths from the knowledge graph for word pairs by mapping word pairs from the set of words into a source word and a destination word and finding the reasoning paths therebetween. The method also includes predicting word co-occurrence frequency using the reasoning paths. The method additionally includes updating, responsive to the word co-occurrence frequency, model parameters of the RRU until a difference between a predicted word occurrence and a true word occurrence are less than a threshold amount to provide a trained RRU.

According to other aspects of the present invention, a computer program product is provided for training a recursive reasoning unit (RRU) to learn word representations. The computer program product includes a non-transitory computer readable storage medium having program instructions embodied therewith. The program instructions are executable by a computer to cause the computer to perform a method. The method includes receiving, by the RRU implemented by a hardware processor of the computer, a knowledge graph for a set of words and a co-occurrence matrix for a different set of words. The knowledge graph (i) maps each of the words in the set of words to a node having a node label and (ii) indicates a relation between adjacent nodes by an edge having an edge label. The co-occurrence matrix indicates word co-occurrence frequency of the different set of words. The method further includes discovering, by the RRU, reasoning paths from the knowledge graph for word pairs by mapping word pairs from the set of words into a source word and a destination word and finding the reasoning paths therebetween. The method also includes predicting, by the RRU, word co-occurrence frequency using the reasoning paths. The method additionally includes updating, by the RRU responsive to the word co-occurrence frequency, model parameters of the RRU until a difference between a predicted word occurrence and a true word occurrence are less than a threshold amount to provide a trained RRU.

According to yet other aspects of the present invention, a computer processing system is provided for training a recursive reasoning unit (RRU) to learn word representations. The computer processing system includes a memory device for storing program code. The computer processing system further includes a hardware processor operatively coupled to the memory device to form the RRU for running the program code to receive a knowledge graph for a set of words and a co-occurrence matrix for a different set of words in a training phase. The knowledge graph (i) maps each of the words in the set of words to a node having a node label and (ii) indicates a relation between adjacent nodes by an edge having an edge label. The co-occurrence matrix indicates word co-occurrence frequency of the different set of words. The hardware processor further runs the program code to discover reasoning paths from the knowledge graph for word pairs by mapping word pairs from the set of words into a source word and a destination word and finding the reasoning paths therebetween. The hardware processor also runs the program code to predict word co-occurrence frequency using the reasoning paths. The hardware processor additionally runs the program code to update, responsive to the word co-occurrence frequency, model parameters of the RRU until a difference between a predicted word occurrence and a true word occurrence are less than a threshold amount to provide a trained RRU.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
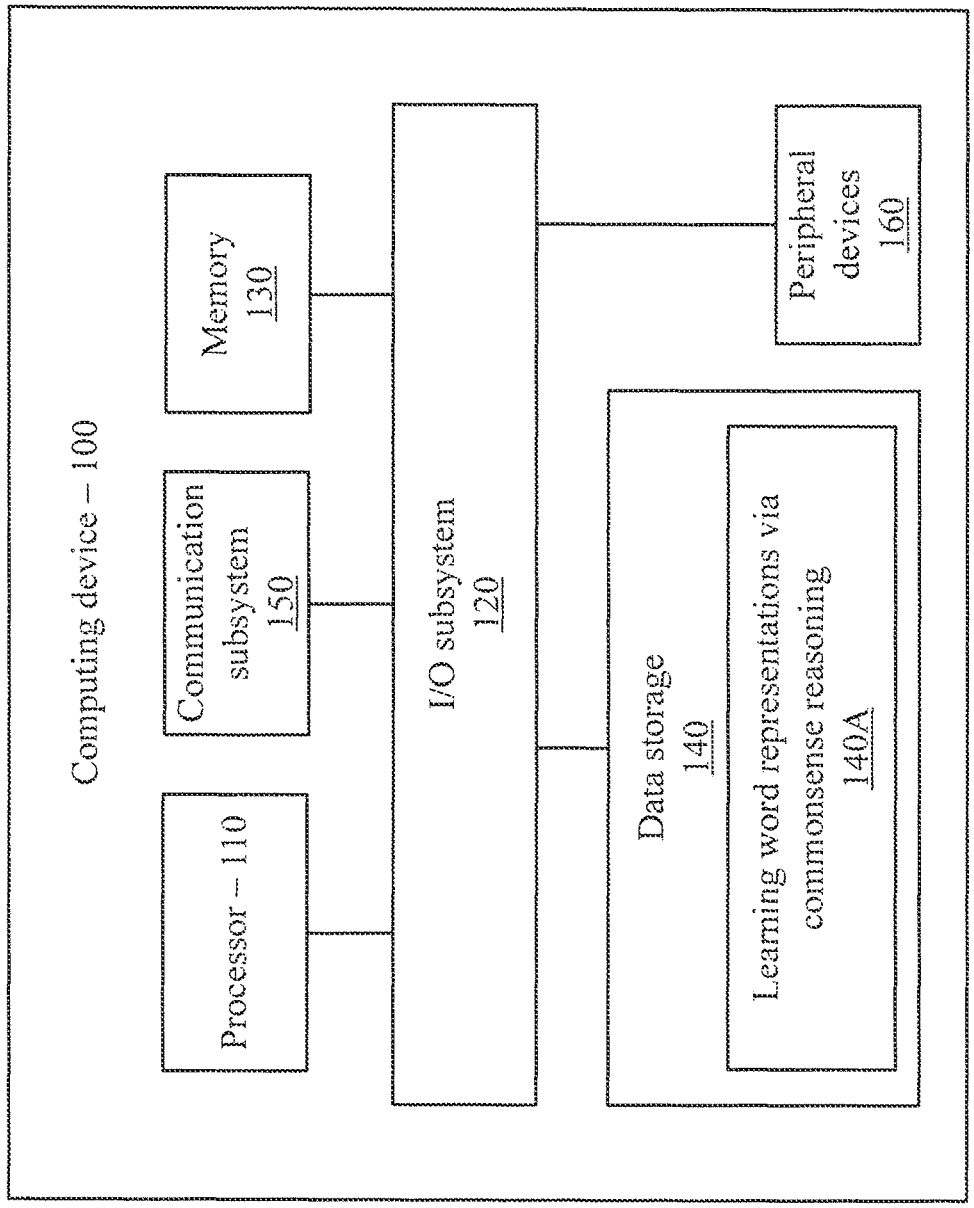
FIG. 1 is a block diagram showing an exemplary computing device, in accordance with an embodiment of the present invention.

Embodiments of the present invention are directed to learning word representations via commonsense reasoning.

Embodiments of the present invention propose commonsense-reasoning-based word representation learning to address the technical issues in existing word representation systems.

In embodiments of the present invention, the input includes a collection of words of interest. The input further includes a commonsense knowledge graph (e.g., ConceptNet), where nodes are individual words and edges indicate known relations between words. Although everything is connected to some extent, such a knowledge graph is usually sparse so that it is practical for storage purpose. The input further includes a self-supervision task that is related to word closeness. An example of such a task is to preserve a word co-occurrence matrix extracted from web articles.

In embodiments of the present invention, the output is a knowledge reasoning system, which decides word closeness for a pair of words by the reasoning path between them.

Embodiments of the present invention provide a novel perspective to build a word representation system that address the aforementioned issues existing in the prior art.

In embodiment of the present invention, domain adaption is label efficient. Essentially, existing word representation systems learn structures between words from scratch. In the phase of fine-tuning, it needs labels to change the structure learned from pre-training to another structure that fits the downstream tasks better. Due to the high complexity of structure changing, it is natural to require a large number of labels to accomplish such tasks. Unlike existing systems, embodiments of the present invention have no need to discover structures among words, as it assumes decent structures have been provided by input commonsense knowledge graphs. For domain adaptation, embodiments of the present invention only need labels to adjust relevant local decision processes, which requires much less labels.

Interpretability in embodiments of the present invention is natural. As word closeness is computed from reasoning paths between words, the underlying reasoning paths provide natural and human-friendly justification for downstream decisions or recommendations.

Embodiments of the present invention work in two phases, namely a training phase and a testing phase. In the training phase, embodiments of the present invention train a knowledge reasoning system under the input self-supervision task. In the testing phase, embodiments of the present invention return word closeness decided by the learned knowledge reasoning system.

Unlike existing methods that learn word representations from an unstructured space, embodiments of the present invention utilize learned reasoning paths from commonsense knowledge graphs to infer word closeness.

In embodiments of the present invention, a Recurrent Reasoning Unit (RRU), a neural-network based model controlled by parameters, is proposed to discover reasoning paths between words. In an embodiment, a self-supervised method is proposed to train parameters in the RRU.

Word embedding has become the cornerstone of modern natural language processing for representing and understanding words in deep learning models. Existing embedding systems (e.g., word2vec, GloVe) map discrete words to continuous vectors used as input for downstream models, and measure word similarities by vector similarity (e.g., cosine similarity). While these vectors preserve a certain amount of word semantics, large-scale labels are still needed for training good downstream models. Moreover, the vector similarity score provides little insight and justification for human users to understand internal relationships between words. Herein, a general framework is proposed to learn better representations for words via commonsense reasoning, with unique advantage in domain adaptation efficiency and reasoning-based interpretability. Instead of simply estimating word vectors from a large text corpus, embodiments of the present invention regularize the estimation process by conducting reasoning over a graph space of commonsense knowledge. A self-supervision task is designed to pre-train a parameterized reasoning process that delivers reasoning paths between words over the graph.

FIG. 1 is a block diagram showing an exemplary computing device 100, in accordance with an embodiment of the present invention. The computing device 100 is configured to learn word representations via commonsense reasoning.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally, or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for learning word representations via commonsense reasoning. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

The computing device 100 can be included in, or operatively coupled to, a recommendation system, a document classification system, a sentiment analysis system, a question answering system, and so forth.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
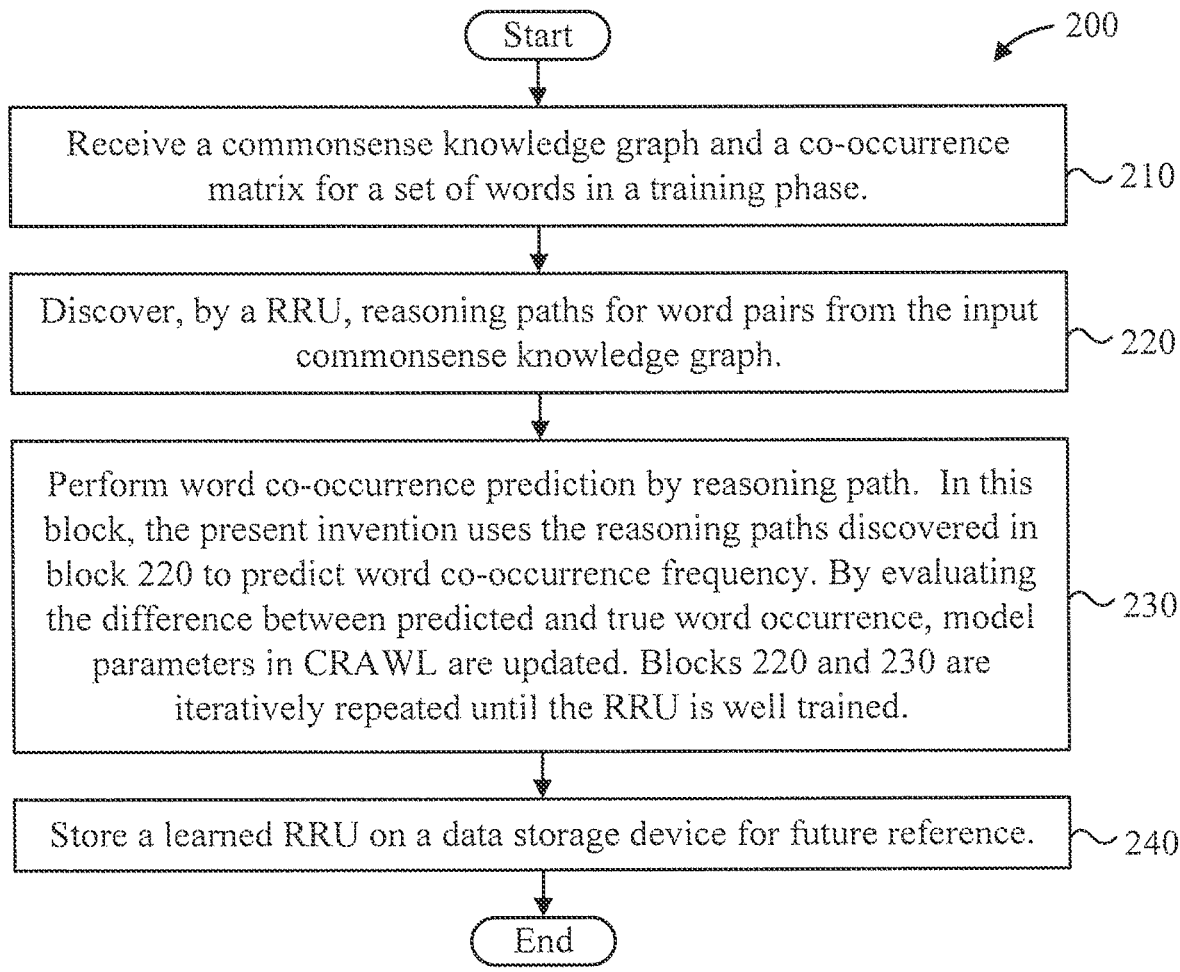
FIG. 2 is a flow diagram showing an exemplary method for a training phase for learning word representations through commonsense reasoning, in accordance with an embodiment of the present invention.

These and other variations of a hardware processor subsystem are also contemplated in accordance with embodiments of the present invention FIG. 2 is a flow diagram showing an exemplary method 200 for a training phase for learning word representations through commonsense reasoning, in accordance with an embodiment of the present invention At block 210, receive a commonsense knowledge graph and a co-occurrence matrix for a set of words in a training phase. Commonsense knowledge graphs are derived from existing commonsense knowledge-bases (e.g., ConceptNet). In such a graph, each node maps to a word (e.g., bean, food, etc.) and each edge indicates the relation between a pair of nodes (e.g., for node "bean" and node "food", an edge of type "is_a_kind_of" connects the two nodes). A co-occurrence matrix indicates word co-occurrence frequency extracted from public text data (e.g., online articles, wiki pages, and so on). In particular, the value in row i and column j indicates the co-occurrence frequency between word i and word j.

At block 220, discover, by a RRU, reasoning paths for word pairs from the input commonsense knowledge graph.

At block 230, perform word co-occurrence prediction by reasoning path. In this block, the present invention uses the reasoning paths discovered in block 220 to predict word co-occurrence frequency. By evaluating the difference between predicted and true word occurrence, model parameters in CRAWL are updated. Blocks 220 and 230 are iteratively repeated until the RRU is well trained (has an error less than a threshold amount).

At block 240, store a learned RRU on a data storage device for future reference.

Figure 3:
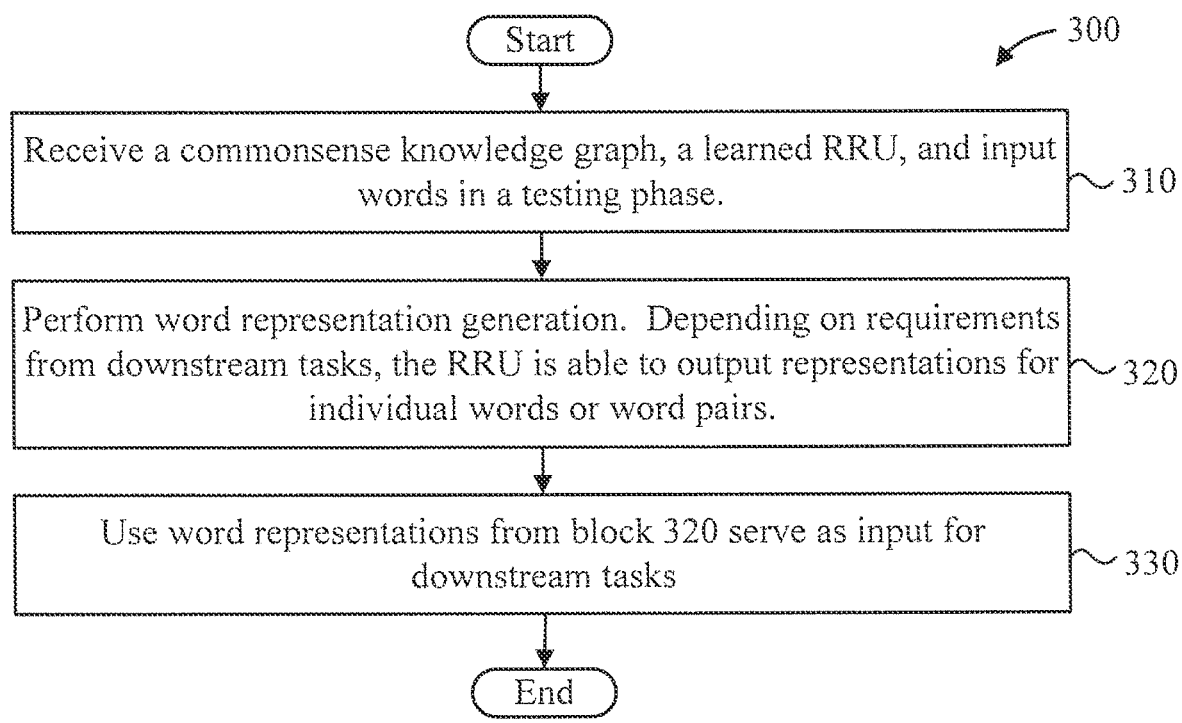
FIG. 3 is a flow diagram showing an exemplary method for a testing phase for learning word representations through commonsense reasoning, in accordance with an embodiment of the present invention.

FIG. 3 is a flow diagram showing an exemplary method 300 for a testing phase for learning word representations through commonsense reasoning, in accordance with an embodiment of the present invention At block 310, receive a commonsense knowledge graph, a learned RRU, and input words in a testing phase. The input commonsense knowledge graph is the same graph referred to in block 210. The learned RRU is the one referred to in bock 240. The input words are those demanding vector representations for downstream tasks At block 320, perform word representation generation. Depending on requirements from downstream tasks, the RRU is able to output representations for individual words or word pairs.

At block 330, use word representations from block 320 serve as input for downstream tasks, such as recommendation, document classification, question answering, sentiment analysis, intention discovery, and so on.

Figure 4:
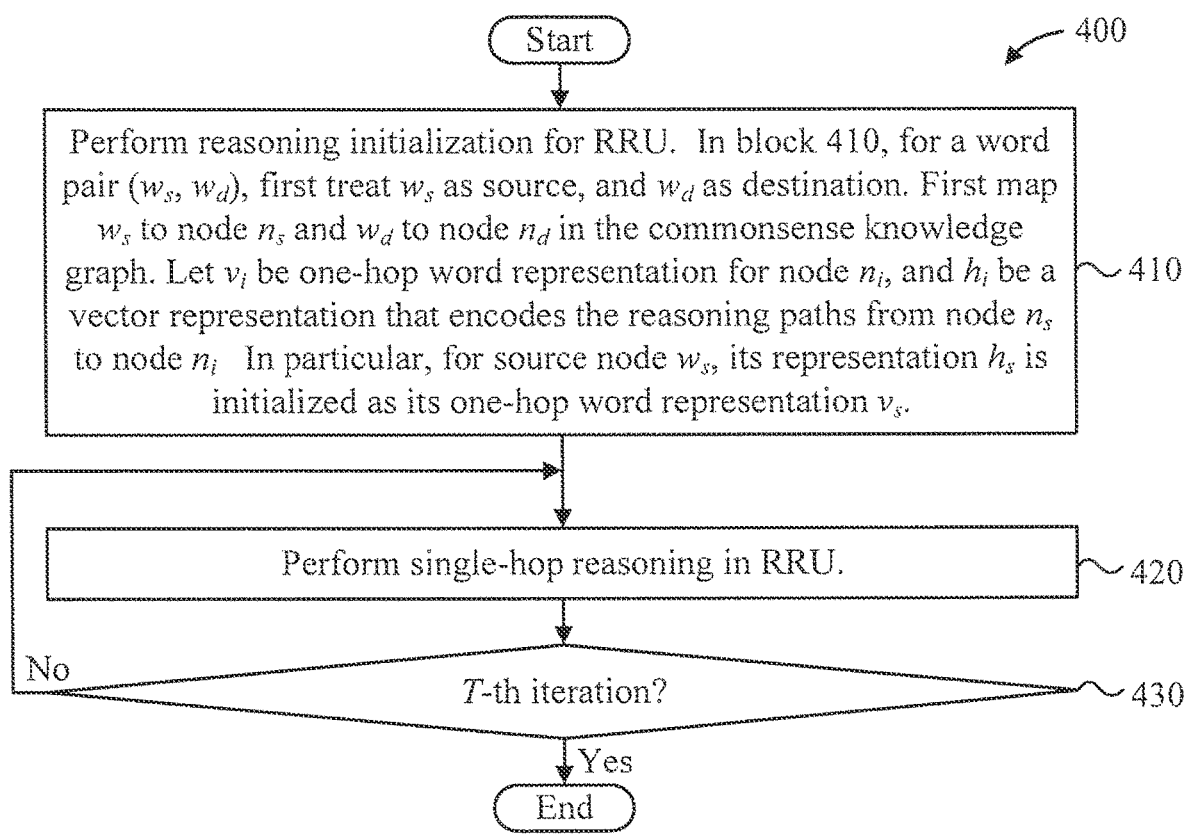
FIG. 4 is a flow diagram further showing block 220 of the method of FIG. 2, in accordance with an embodiment of the present invention.

FIG. 4 is a flow diagram further showing block 220 of method 200 of FIG. 2, in accordance with an embodiment of the present invention.

At block 410, perform reasoning initialization for RRU. In block 410, for a word pair $(w_s, w_d)$, first treat $w_s$ as source, and $w_d$ as destination. First map $w_s$ to node ns and $w_d$ to node $n_d$ in the commonsense knowledge graph. Let $v_i$ be one-hop word representation for node $n_i$, and $h_i$ be a vector representation that encodes the reasoning paths from node $n_s$ to node $n_i$. In particular, for source node $w_s$, its representation $h_s$ is initialized as its one-hop word representation $v_s$.

At block 420, perform single-hop reasoning in RRU. Let $h_i^{(k)}$ be a vector that encodes the reasoning path information from $n_s$ to $n_i$ after k hops of reasoning. The probability $t_{ij}^{(k)}$ that a reasoning path will be extended to node $n_j$ is computed as follows $$z_{ij}^{(k)} = W_r[h_i^{(k)}, e_{ij}, v_j] + b_r,$$

$$t_{ij}^{(k)} = \text{softmax}_{n_j \in N(i)}(z_{ij}^{(k)})$$

where [ ] operator means vector concatenation, $W_r$, $b_r$ are learnable model parameters, $e_{ij}$ is the vector representation for edge attributes between node $n_i$ and $n_j$, $v_j$ is the one-hop word representation for node $n_j$, N(i) indicates one-hop neighbors of node $n_i$, and softmax means the softmax function in neural networks. Furthermore, the reason path information for (k+1) hops can be updated by the following equation:

$$h_j^{(k+1)} = \sum_{n_i \in N(j)} t_{ij}^{(k)}(W_o[h_i^{(k)}, e_{ij}, v_j] + b_o),$$

where $W_o$, $b_o$ are learnable model parameters.

At block 420, determine if block 420 has been repeated T times. If not, return to block 420. Otherwise, the method is terminated.

By repeating block 420 for T times (T is a meta-parameter, e.g., T=8), the present invention can collect expected reasoning paths and their representations as $h_{s \to d} = h_d^{(T)}$. Similarly, treat $w_d$ as a source, and $w_s$ as a destination. By repeating block 220, $h_{d \to s}$ is obtained. The reasoning path representation for word pair $(w_s, w_d)$ is finalized as $h_{sd} = h_{s \to d} + h_{d \to s}$.

Figure 5:
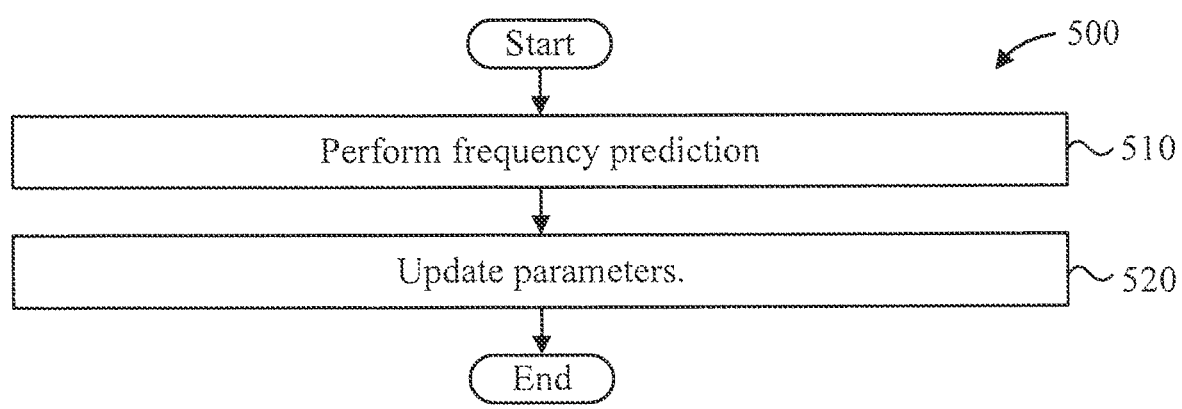
FIG. 5 is a flow diagram further showing block 230 of the method of FIG. 2, in accordance with an embodiment of the present invention.

FIG. 5 is a flow diagram further showing block 230 of method 200 of FIG. 2, in accordance with an embodiment of the present invention.

At block 510, perform frequency prediction. Let $(w_i, w_j)$ be a pair of words with ground-truth word co-occurrence frequency $f_{ij}$ and reasoning path representation $h_{ij}$. The word co-occurrence prediction $p_{ij}$ is computed by the following equation:

$$p_{ij} = \text{sigmoid}(W_p h_{ij} + b_p),$$

where $W_p$, $b_p$ are learnable parameters, and sigmoid means the sigmoid activation function in neural networks.

At block 520, update parameters. Given $f_{ij}$ (ground-truth) and $p_{ij}$ (prediction), loss function $L(f_{ij}, p_{ij})$ is formulated as cross-entropy or regression loss. To minimize the loss, we utilize standard gradient-based backpropagation methods to update model parameters, including $W_r$, $b_r$, $W_o$, $b_o$, (discussed in block 420) and $W_p$, $b_p$ (discussed in block 510).

By iteratively executing blocks 510 and 520, the RRU is able to be progressively trained. When stop criteria is met (e.g., a convergence threshold is reached or a maximum number of iterations is reached), the training of the RRU will be terminated.

Figure 6:
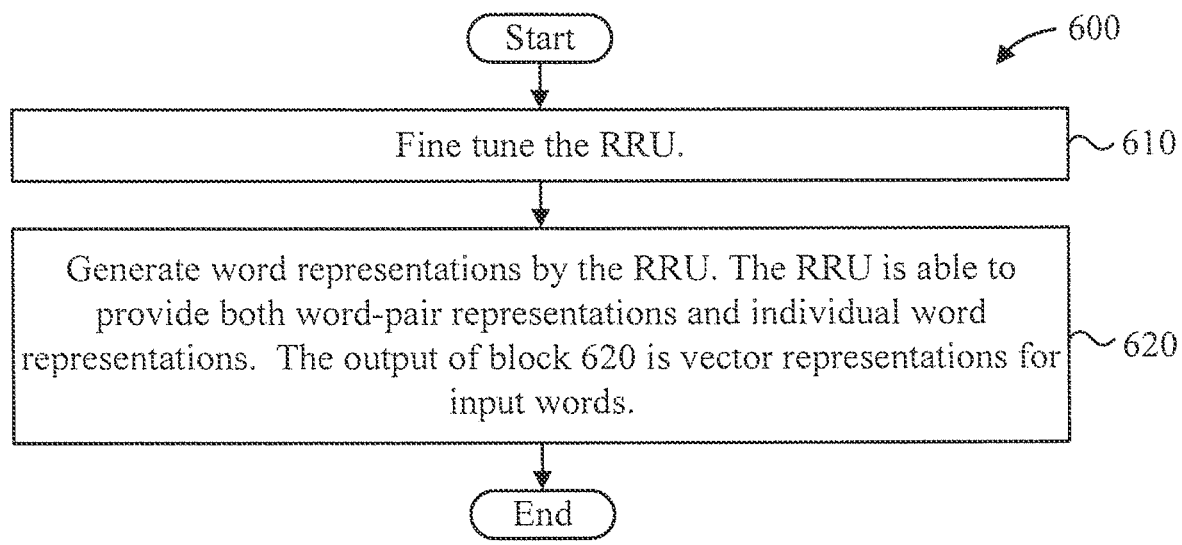
FIG. 6 is a flow diagram further showing block 320 of the method of FIG. 3, in accordance with an embodiment of the present invention.

FIG. 6 is a flow diagram further showing block 320 of method 300 of FIG. 3, in accordance with an embodiment of the present invention.

At block 610, fine tune the RRU. This step is performed if some extra data on word co-occurrence statistics based on specific downstream tasks are provided. Such extra training data may not be consistent with the word co-occurrence matrix discussed in block 210. By iteratively executing blocks 220 and 230, the parameters in the RRU are updated to fit the extra training data.

At block 620, generate word representations by the RRU. The RRU is able to provide both word-pair representations and individual word representations. The output of block 620 is vector representations for input words.

Word-pair representations are the natural output from RRU. Given a pair of words $(w_i, w_j)$, $h_{ij}$ provided by the RRU serves as the word-pair representation.

Individual word representations are provided as follows. A learned RRU provides a co-occurrence prediction $p_{ij}$ for word $w_i$ and $w_j$. In other words, the RRU redefines the distance between nodes in commonsense knowledge graphs. By an existing graph embedding system, the present invention can compute individual nodes' (words') vector representations that preserve the distance defined by a learned RRU.

Figure 7:
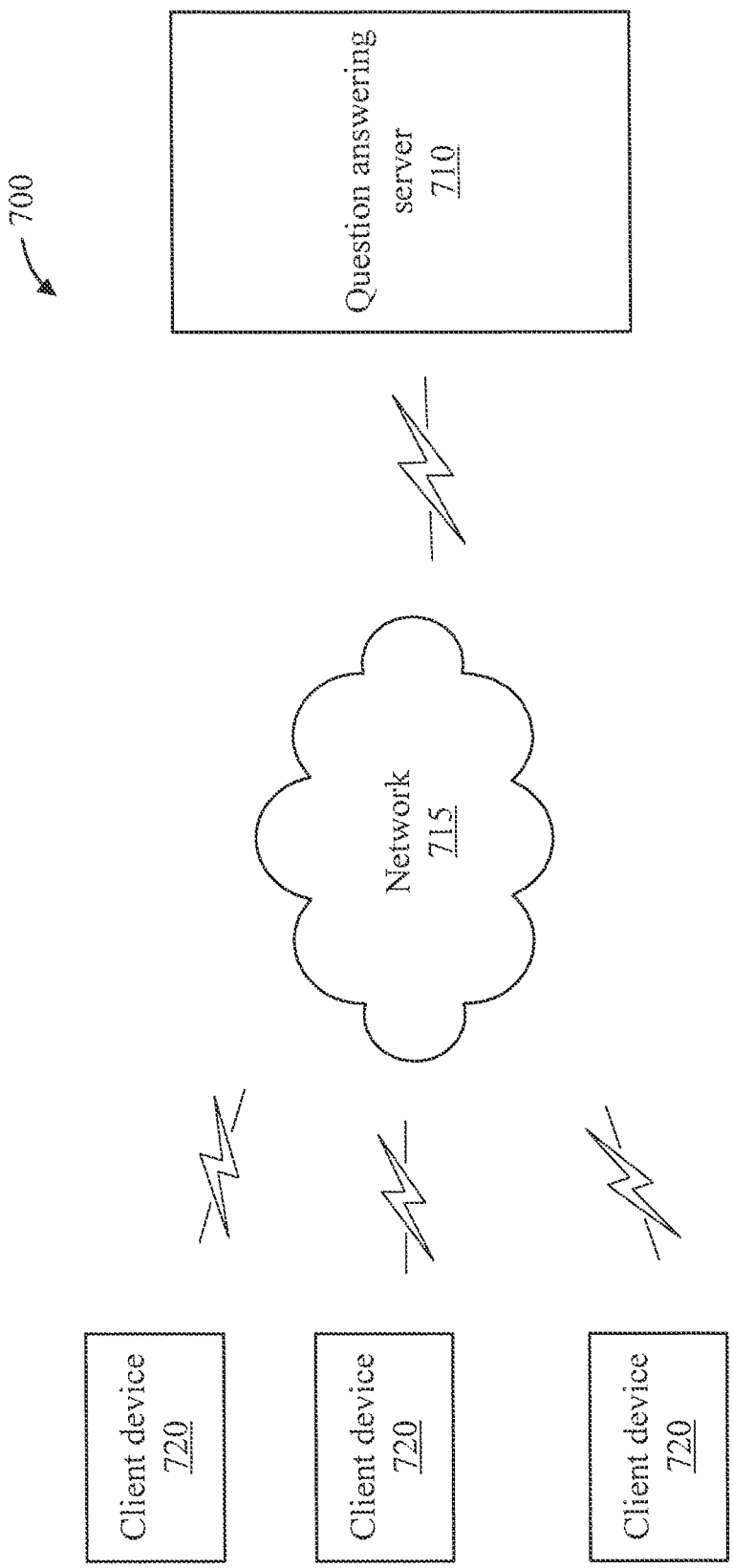
FIG. 7 is a block diagram showing an exemplary environment 700 to which the present invention can be applied, in accordance with an embodiment of the present invention.

FIG. 7 is a block diagram showing an exemplary environment 700 to which the present invention can be applied, in accordance with an embodiment of the present invention.

The environment 700 is directed to a question answering server 710 accessible through one or more networks 715 by one or more client devices 720. The client devices provide an input query (sentence) that is evaluated by the question answering server 710 in order to provide an answer based on commonsense reasoning using the methods described herein. In particular, given a set of words of interest (an input query), similar words in an answer space can be found and provided to a user of a client device 720.

A further description will now be given regarding various aspects of the present invention.

Different from previous work that tries to inject external knowledge by defining knowledge-aware objective functions, embodiments of the present invention directly model the structure knowledge. Specifically, a new path-based graph neural network is proposed that can model the path distribution between a pair of words in the commonsense graph. The present invention pre-trains this graph network by popular global co-occurrence statistics to capture the commonsense signal included in a large text corpus. After re-parametrizing the commonsense knowledge in the graph by the co-occurrence pre-training, the word vectors are learned from the new graph and integrated into downstream tasks.

Embodiments of the present invention propose a new graph neural network to perform multi-hop reasoning over commonsense knowledge graph.

Embodiments of the present invention introduce a new way to learn word representations powered by commonsense reasoning.

Embodiments of the present invention provide learned word representations that can improve downstream models and provide interpretability for word similarities.

A further description will now be given regarding a methodology of the present invention.

The reasoning network essentially learns how to navigate the reasoning process from a source word s to a target word t within K hops and represent such multi-hop reasoning process as a vector. Such reasoning vector is denoted as $v_{s \to t} = f(s, t|G, \theta)$.

A description will now be given regarding pre-training commonsense knowledges, in accordance with an embodiment of the present invention.

To inject the commonsense knowledge into the reasoning process, it is proposed to pre-train the parameters by global statistics.

Let the global co-occurrence matrix be denoted by X in which $X_{ij}$ represents the number of times word j occurs in the context of word i and $X_i = \Sigma_k X_{ik}$ is the total number of times any words appears in the context of word i. Also, we denote the probability that word j appears in the context of word i as $P_{i,j} = p(j|i) = X_{i,j}/X_i$.

Embodiments of the present invention involve training the reasoning network to fit the global statistics by applying a simple linear transformation on the reasoning vectors by defining the conditional probability of reaching j from i as follows:

$$Q_{i,j} = \hat{p}(j|i) = \frac{\exp(w^T v_{i \to j})}{\sum_{k \in V} \exp(w^T v_{i \to k})}$$

To minimize the distance between the estimated probability $\hat{p}(j|i)$ and empirical probability $p(j|i)$, there are several possible distance measures, such as cross entropy. Due to the computational bottleneck of normalization operation for cross entropy loss, a least square loss is chosen between two unnormalized distributions, $\tilde{P}_{i,j} = X_{i,j}$ and $\tilde{Q}_{i,j} = \exp(w^T v_{i \to j})$. For numerical stability, their logarithms are taken and the objective can be defined as follows:

$$L_1 = \sum_{i,j} g(X_i)(\log \tilde{P}_{i,j} - \log \tilde{Q}_{i,j})^2 = \sum_{i,j} g(X_i)(w^T v_{i \to j} - \log X_{ij})^2$$

where $g(\cdot)$ is a weighting function to discount the influence of frequent words (occurring greater than a threshold amount).

A description will now be given regarding the commonsense reasoning network, in accordance with an embodiment of the present invention.

In particular, details of the reasoning network that is pre-trained to learn commonsense knowledge by reasoning over the graph is described with respect to the following:

$$p^{(k)}(v|u) = \frac{\exp(\psi(u, v, r_{u,v}))}{\sum_{a \in N_u^{out}} \exp(\psi(u, a, r_{u,a}))}$$

$$h_u^{(k+1)} = \sum_{(r,v) \in N_u^{in}} p^{(k)}(v|u) \cdot m_{s,v}^{(k)} \cdot \phi(u, v, r) + h_u^{(k)}$$

$$v_{s,t} = h_t^{(K)}$$

A description will now be given regarding deriving word representations, in accordance with an embodiment of the present invention.

Now that it has been described how we can pre-train the reasoning network, it is further introduced how to derive the representation for each word.

As previously described, at each hop, for an intermediate word u between s and t, there is a transition probability, $p(v|u)$, $v \in N_u^{out}$. In other words, at each hop, the reasoning network provides a transition matrix, $M^k$, in which $M^k(u,v)$ $p(v|u)$. In order to learn meaningful word representations, it is proposed to reconstruct the reasoning process, that is, the transition matrix or a re-weighted graph.

From the perspective of matrix factorization, the transition matrix at k hop can be decomposed as $M_k = U_k \Sigma_k \cdot V_k^T$, in which $U_k(V_k)$ represent vectors for words when they are the source (target) word. However, it would be computationally prohibitive to explicitly calculate the exact value of transition matrix. Thus, the decomposition is approximated by defining tractable functions for $U_k$ and $V_k$. To be specific, for a given set of edges sampled from the re-weighted graph, $E_k \in \{e_0, e_1, \ldots, e_m\}$, $e_i = e(v_{src_i}, v_{tgt_i}) \in V$, there are non-negative edge weights, $w(e_i)$ obtained from the reasoning network. Two neural networks are defined for $U_k$ and $V_k$ to reconstruct the edges as follows:

$$\hat{w}(e_i) = f_s(v_{src_i}) \cdot W_\Sigma \cdot f_t(v_{tgt_i})^T$$

where $f_s$ and $f_t$ are projection functions to produce an embedding for source and target words at each hop, respectively, $v_{src_i}$ and $v_{tgt_i}$ are embedding parameters, and $W_\Sigma$ is a trainable parameter. The above parameterized model is trained by a straightforward mean-square error (MSE) loss as follows:

$$L_2 = \frac{1}{N} \sum_{i=1}^{N} (w_i - \hat{w}_i)^2$$

where N is the number of edges to sample.

Note that there are two conditions to consider, for k=1 and k>1. The difference is that when k=1, edges' attention weights only depend on a single source word which is unambiguous to calculate, while when k>1, these weights depend on multiple source words. For the second case, the weights are represented by taking their mean and variance of all possibilities.

Finally, the word representations can be obtained by concatenating all source/target embeddings from each hop.

A further description will now be given regarding various aspects of the present invention.

In an embodiment, the input is a commonsense knowledge base and a self-supervision task related to word closeness. One example of a self-supervision task is recovering the global co-occurrence statistics for all pairs.

In an embodiment, the output is a trained reasoning system. Given a pair of words, the model (RNN) returns their closeness based on the reasoning paths between them.

A core system element, the RRU, explores the commonsense knowledge base to find paths between words. The paths can be decomposed to several steps.

In each step, the RRU selects the next word based on a learnable transition probability distribution, and masks all source irrelevant information, as follows:

Overall, by iteratively executing the reasoning unit multiple times, paths are built between words.

In an embodiment, the RRU is implemented by deep neural networks.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a recursive reasoning unit (RRU) to learn word representations, comprising:

receiving a knowledge graph for a set of words and a co-occurrence matrix for a different set of words in a training phase, the knowledge graph (i) mapping each of the words in the set of words to a node having a node label and (ii) indicating a relation between adjacent nodes by an edge having an edge label, the co-occurrence matrix indicating word co-occurrence frequency of the different set of words;

using a weighting function in the se matrix to discount an influence of frequent words occurring greater than a first threshold amount;

discovering, by the RRU, reasoning paths from the knowledge graph for word pairs by mapping word pairs from the set of words into a source word and a destination word and finding the reasoning paths therebetween;

predicting word co-occurrence frequency using the reasoning paths; and updating, responsive to the word co-occurrence frequency, model parameters of the RRU until a difference between a predicted word occurrence and a true word occurrence are less than a second threshold amount to provide a trained RRU.

2. The computer-implemented method of claim 1, wherein said predicting step applies a sigmoid neural network activation function to the reasoning paths and learnable parameters of the RRU.

3. The computer-implemented method of claim 1, further comprising:

receiving the knowledge graph, a learned RRU, and input test words to be represented by the word representations in a test phase; and selectively generating, by the RRU using the knowledge graph, vector word representations for at least one of individual words and word pairs, from among the input test words.

4. The computer-implemented method of claim 3, further comprising performing a question-answering session using the vector word representations as an input query.

5. The computer-implemented method of claim 3, further comprising performing a sentiment analysis using the vector word representations as an input query.

6. The computer-implemented method of claim 1, further comprising obtaining vector word representations by concatenating all word embedding from each hop along a given reasoning path.

7. The computer-implemented method of claim 1, further comprising, for intermediate words at each hop along a given one of the reasoning paths, calculating transition probabilities to a next hop word along the given one of the reasoning paths.

8. A computer program product for training a recursive reasoning unit (RRU) to learn word representations, the computer program product comprising a non-transitory computer readable storage medium having program instructions embodied therewith, the program instructions executable by a computer to cause the computer to perform a method comprising:

receiving, by the RRU implemented by a hardware processor of the computer, a knowledge graph for a set of words and a co-occurrence matrix for a different set of words, the knowledge graph (i) mapping each of the words in the set of words to a node having a node label and (ii) indicating a relation between adjacent nodes by an edge having an edge label, the co-occurrence matrix indicating word co-occurrence frequency of the different set of words;

using a weighting function in the co-occurrence matrix to discount an influence of frequent words occurring greater than a first threshold amount:

discovering, by the RRU, reasoning paths from the knowledge graph for word pairs by mapping word pairs from the set of words into a source word and a destination word and finding the reasoning paths therebetween;

predicting, by the RRU, word co-occurrence frequency using the reasoning paths; and updating, by the RRU responsive to the word co-occurrence frequency, model parameters of the RRU until a difference between a predicted word occurrence and a true word occurrence are less than a second threshold amount to provide a trained RRU.

9. The computer program product of claim 8, wherein said predicting step applies a sigmoid neural network activation function to the reasoning paths and learnable parameters of the RRU.

10. The computer program product of claim 8, further comprising:

inputting the knowledge graph, a learned recursive reasoning unit (RRU), and input test words to be represented by the word representations; and selectively generating, by the RRU using the knowledge graph, vector word representations for at least one of individual words and word pairs, from among the input test words.

11. The computer program product of claim 10, further comprising performing a question-answering session using the vector word representations as an input query.

12. The computer program product of claim 10, further comprising performing a sentiment analysis using the vector word representations as an input query.

13. The computer program product of claim 8, further comprising obtaining vector word representations by concatenating all word embedding from each hop along a given reasoning path.

14. The computer program product of claim 8, further comprising, for intermediate words at each hop along a given one of the reasoning paths, calculating transition probabilities to a next hop word along the given one of the reasoning paths.

15. A computer processing system for training a recursive reasoning unit (RRU) to learn word representations, comprising:

a memory device for storing program code; and a hardware processor operatively coupled to the memory device to form the RRU for running the program code to:

receive a knowledge graph for a set of words and a co-occurrence matrix for a different set of words in a training phase, the knowledge graph (i) mapping each of the words in the set of words to a node having a node label and (ii) indicating a relation between adjacent nodes by an edge having an edge label, the co-occurrence matrix indicating word co-occurrence frequency of the different set of words;

use a weighting function in the co-occurrence matrix to discount an influence of frequent words occurring greater than a first threshold amount;

discover reasoning paths from the knowledge graph for word pairs by mapping word pairs from the set of words into a source word and a destination word and finding the reasoning paths therebetween;

predict word co-occurrence frequency using the reasoning paths; and update, responsive to the word co-occurrence frequency, model parameters of the RRU until a difference between a predicted word occurrence and a true word occurrence are less than a second threshold amount to provide a trained RRU.

16. The computer processing system of claim 15, wherein the word co-occurrence frequency is predicted by applying a sigmoid neural network activation function to the reasoning paths and learnable parameters of the RRU.

17. The computer processing system of claim 15, wherein the hardware processor is further configured to run the program code as the RRU to:

receive the knowledge graph, a learned RRU, and input test words to be represented by the word representations in a test phase; and selectively generate, using the knowledge graph, vector word representations for at least one of individual words and word pairs, from among the input test words.

18. The computer processing system of claim 17, wherein the hardware processor is further configured to run the program code as the RRU to perform a question-answering session using the vector word representations as an input query.

* * * * *